US006742394B1

(12) United States Patent
Stuttaford et al.

(10) Patent No.: US 6,742,394 B1
(45) Date of Patent: Jun. 1, 2004

(54) GAS TURBINE COMBUSTOR HYBRID DYNAMIC-STATIC PROBE

(75) Inventors: Peter Stuttaford, Jupiter, FL (US); Andrew Green, Jupiter, FL (US)

(73) Assignee: Power Systems MFG, LLC, Jupiter, FL (US)

( * ) Notice: Subject to any disclaimer, the term of this patent is extended or adjusted under 35 U.S.C. 154(b) by 11 days.

(21) Appl. No.: 10/341,573

(22) Filed: Jan. 13, 2003

(51) Int. Cl.[7] .............................. G01L 7/00; F02C 3/00
(52) U.S. Cl. ........................... 73/700; 73/756; 60/39.01
(58) Field of Search ................... 73/756, 700; 60/39.01

(56) References Cited

U.S. PATENT DOCUMENTS 4,378,693 A * 4/1983 Ratcliffe ...................... 73/105
4,480,930 A 11/1984 DeZubay et al.
4,620,093 A 10/1986 Barkhoudarian et al.
4,730,487 A * 3/1988 DeLeo et al. ................. 73/182
4,843,880 A * 7/1989 Sommer .................. 73/170.14
4,920,808 A * 5/1990 Sommer .................. 73/861.42
5,544,478 A 8/1996 Shu et al.
6,354,071 B2 3/2002 Tegel et al.

* cited by examiner

*Primary Examiner*—Edward Lefkowitz
*Assistant Examiner*—Andre Allen
(74) *Attorney, Agent, or Firm*—Brian R. Mack

(57) ABSTRACT

A removable instrumentation assembly and probe for use in simultaneously measuring dynamic pressure, at least one static pressure, and temperature for a gas turbine combustor. The instrumentation assembly allows combustor performance analysis as well as monitoring of component integrity through dynamic pressure fluctuations. The instrumentation assembly includes a probe having a plurality of passages, each connected to tubular conduits for measuring and recording respective pressures. In the preferred embodiment, dynamic pressures from within a combustion chamber are measured and recorded along with static pressures within the combustion chamber and outside of the combustion chamber, along with external air temperature.

14 Claims, 4 Drawing Sheets

GAS TURBINE COMBUSTOR HYBRID DYNAMIC-STATIC PROBE

BACKGROUND OF THE INVENTION

1. Field of the Invention

This invention relates to gas turbine combustors and more specifically to a measurement device for quantifying combustor static and dynamic pressure levels as well as temperature.

2. Description of Related Art

It is a well known requirement to measure and monitor the pressure and temperature levels within a combustion system in order to ensure acceptable system durability and reliability. Within a combustion system, pressure fluctuations occur as part of the combustion process, and this is especially common with fuel-lean combustion systems. As combustion systems become more air-rich due to a lower fuel/air ratio, stability of the flame within the combustor becomes a concern. It is this instability that is a common driver of combustion dynamics. Excessive combustion dynamics can cause premature failure and require replacement of combustion hardware. Typically, a variety of equipment is required in order to measure the static pressures, dynamic pressures, as well as temperature. Combustion systems of the prior art have been known to use internally mounted dynamic pressure transducers, externally mounted accelerometers, or optical sensors to detect combustion dynamic pressure levels. With externally mounted accelerometers, only dynamic pressure was recorded. Optical sensors correlated spectral acoustic frequency of the ultraviolet flame emission with dynamic pressure waves characteristic of combustion dynamics. Meanwhile, static pressure levels were obtained by mounting separate pressure taps at the areas of interest while temperatures were measured through individual thermocouples.

While each of these devices may be acceptable individually to measure dynamic pressure, static pressure, or temperatures, multiple installations of costly instrumentation are required in order to capture all three types of data. What is needed is a device that can perform all of the above-described functions while requiring minimal installation time and at a reasonable cost.

SUMMARY AND OBJECTS OF THE INVENTION

The invention facilitates the acquisition of combustor diagnostic information such as dynamic pressure fluctuations, static pressure levels, combustion system pressure drop for mass flow correlation, and temperature with minimal equipment, installation time, or capital investment. In an exemplary embodiment a probe, which can easily be removed from a combustor, is connected to an instrumentation assembly that is capable of simultaneously measuring dynamic pressure, temperature, and at least one static pressure for a gas turbine combustor. The ease of installation allows rapid performance point benchmarking of different ambient day conditions. This information is critical to ensure low emissions operations over a range of ambient conditions. The removable probe is utilized in an instrumentation assembly that includes a plurality of conduits fixed to the probe as well as means for measuring and recording each of the pressures and temperatures.

It is an object of the present invention to provide a removable probe for use in a gas turbine combustor wherein the probe is capable of simultaneously measuring dynamic pressure, temperature, and at least one static pressure.

It is a further object of the present invention to provide a removable instrumentation assembly requiring minimal installation time and reduced cost.

In accordance with these and other objects, which will become apparent hereinafter, the instant invention will now be described with particular reference to the accompanying drawings.

DETAILED DESCRIPTION OF THE PREFERRED EMBODIMENT

Figure 1:
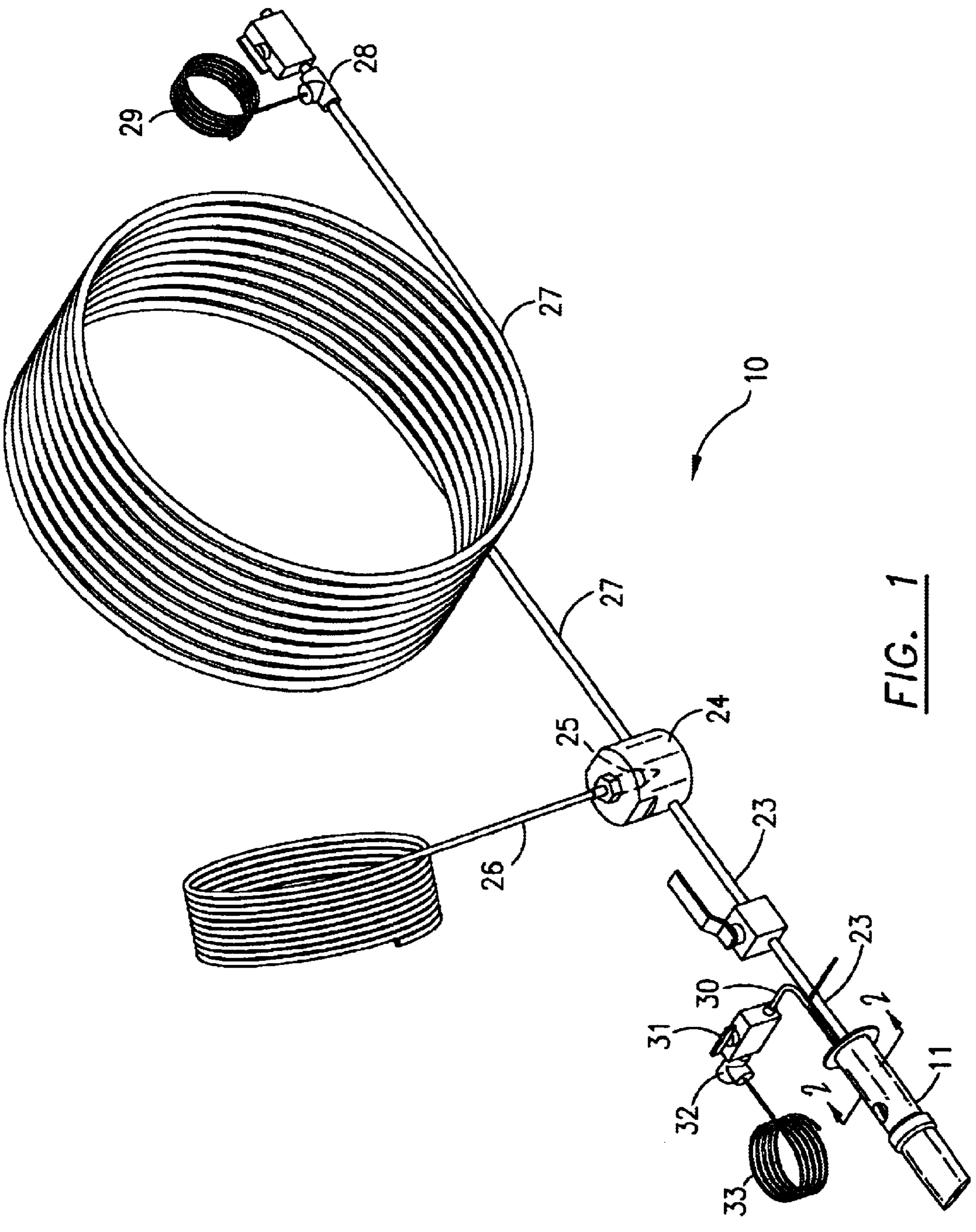
FIG. 1 is a perspective view of the instrumentation assembly and removable probe in accordance with the present invention.
Figure 2:
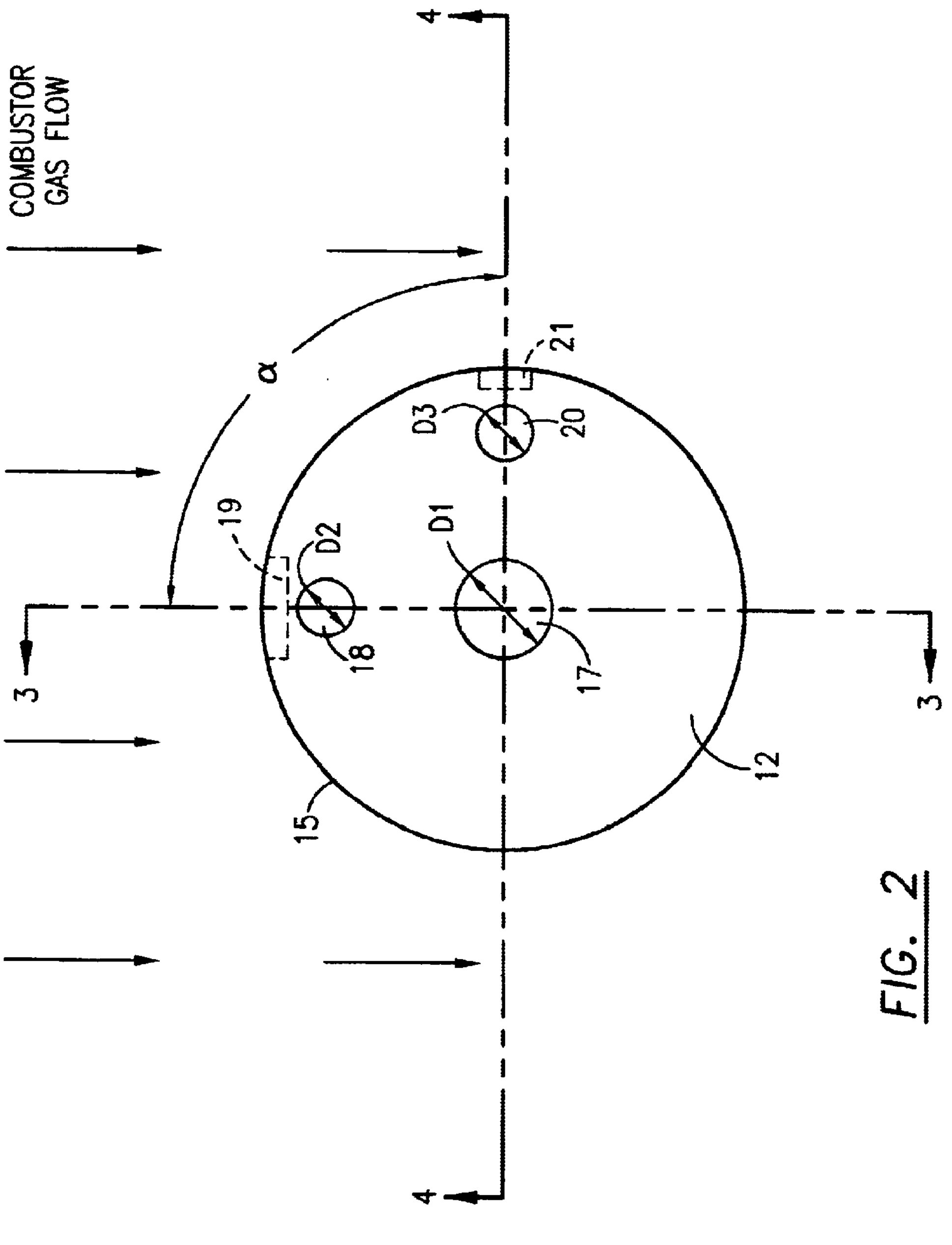
FIG. 2 is an end view of the removable probe in accordance with the present invention.
Figure 3:
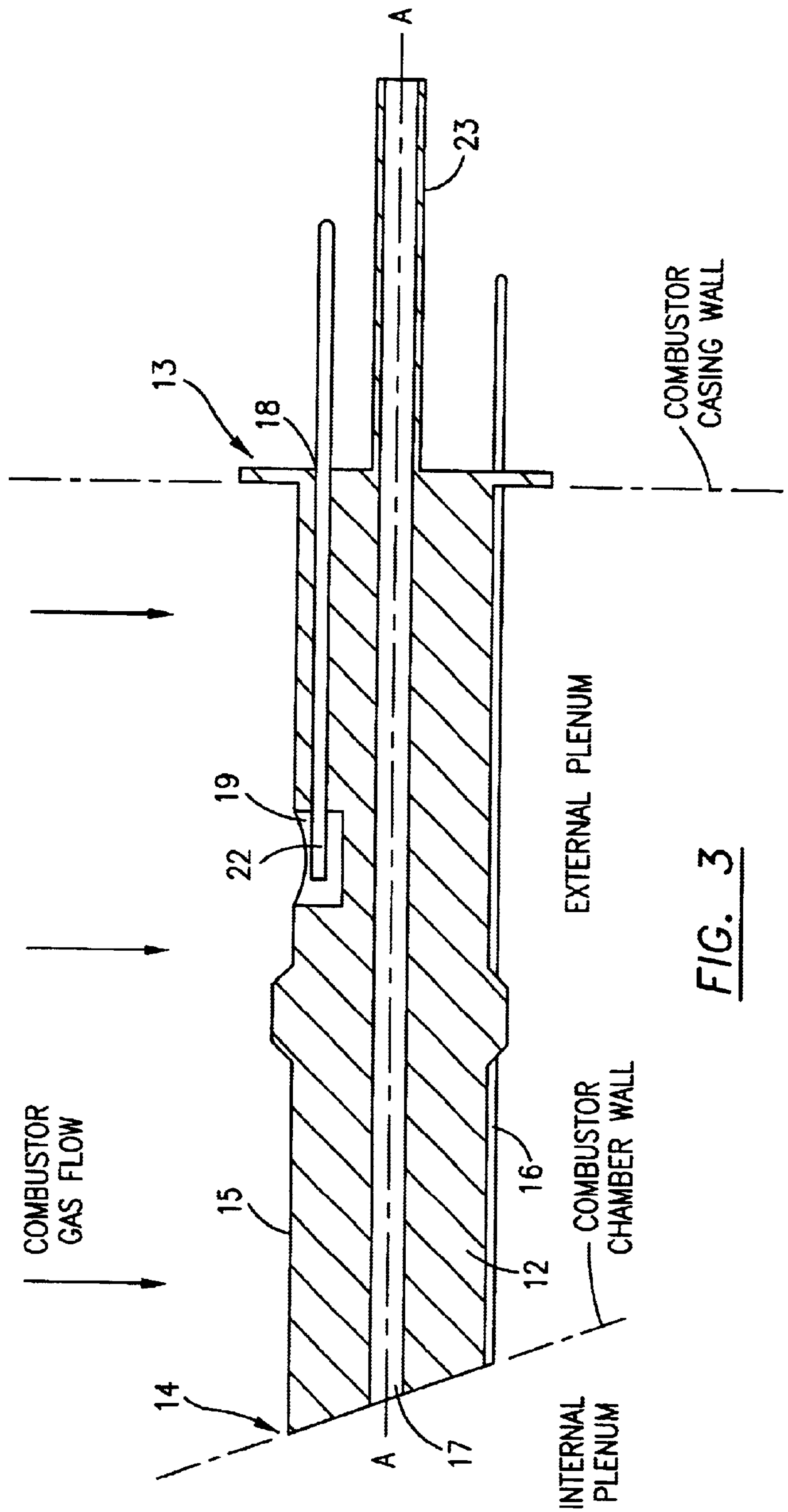
FIG. 3 is a cross section view of the removable probe in accordance with the present invention.
Figure 4:
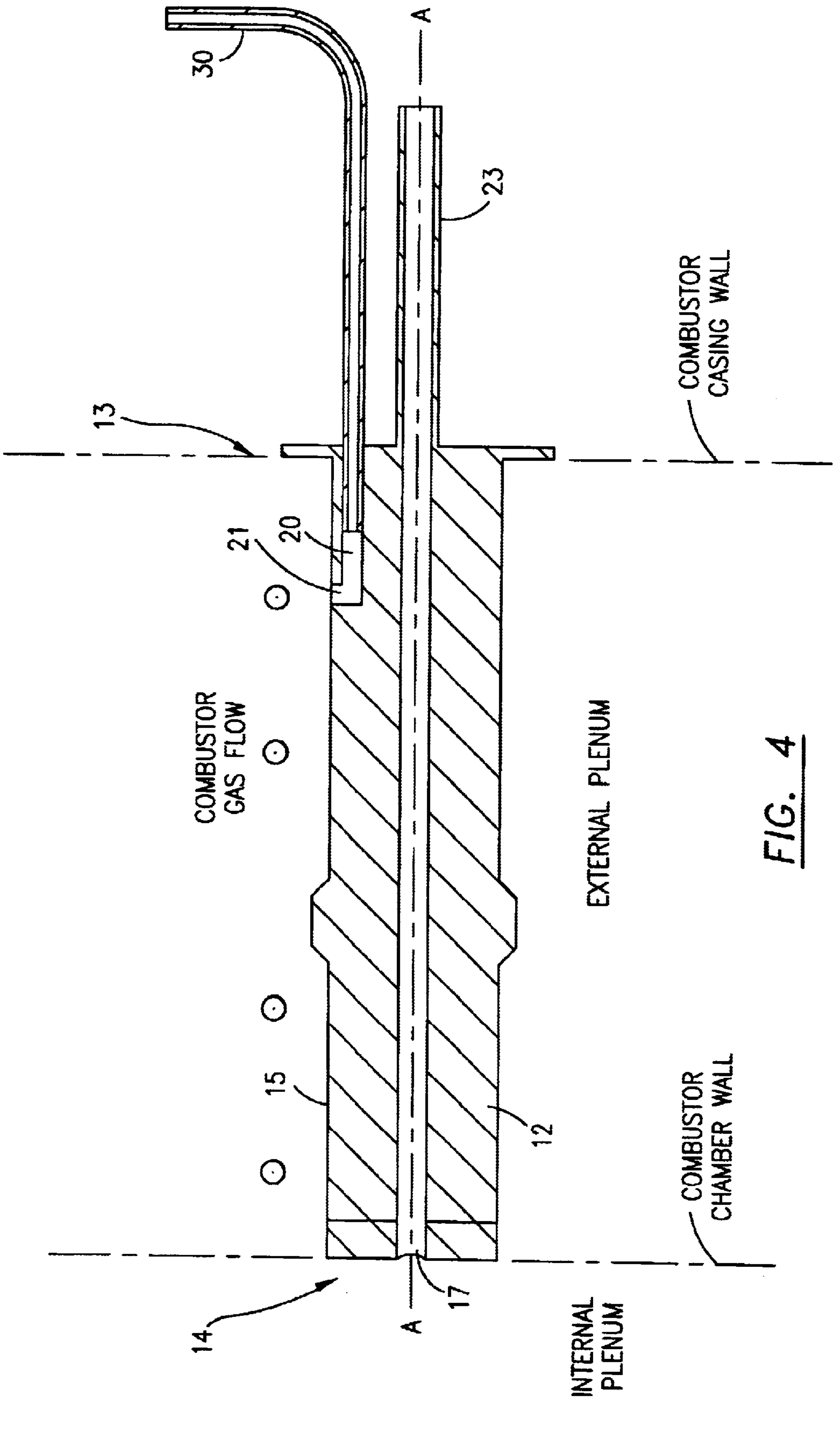
FIG. 4 is an additional cross section view of the removable probe in accordance with the present invention.

Referring to FIG. 1, a removable instrumentation assembly 10 for use in a gas turbine combustor is shown. Instrumentation assembly 10, which is capable of simultaneously measuring combustor dynamic pressure, temperature, and at least one static pressure, comprises a probe 11, a plurality of tubular conduits, a plurality of cables, as well as measurement and recording devices. Referring to FIGS. 2–4, probe 11 includes a housing 12, preferably generally circular in cross section, having a first end 13, a second end 14, a centerline A—A, an outer surface 15, and a plurality of passages contained within housing 12. Probe 11 is configured such that, when installed in a combustor, second end 14 is flush to a combustor chamber wall, as shown in FIGS. 3 and 4. Due to the operating environment, probe 11 is manufactured from a high temperature alloy such as nickel-based or cobalt-based alloy. A first passage 17 has a first diameter D1 and extends from first end 13 to second end 14 and is coaxial to centerline A—A. Radially outward of first passage 17 is a second passage 18 that has a second diameter D2 and extends from first end 13 to a first opening 19 in outer surface 15. Located within second passage 18 is a first thermocouple 22 extending into first opening 19 for measuring the temperature of a fluid medium contained within first opening 19 and second passage 18. Orientation of second passage 18 and first thermocouple 22 can be at any position desired about housing 12. For most accurate temperature readings it is preferred that first thermocouple 22 be positioned directly in line with oncoming combustion gas flow, as shown in FIGS. 2 and 3. Also located in housing 12 is a third passage 20 having a third diameter D3 with third passage 20 extending from first end 13 to a second opening 21 in outer surface 15. First opening 19 is sized to provide sufficient exposure of thermocouple 22 to the surrounding combustion gases, and in the preferred embodiment, first opening 19 is larger in area than second opening 21. As shown in FIG. 2, third passage 20 is also radially outward of first passage 17 but is preferably oriented at a circumferential angle relative to second passage 18. For optimum static pressure measurement, second opening 21 is oriented such that it is generally perpendicular to the flow of combustion gases within a combustor, as shown in FIGS. 2 and 4. As probe 11 is configured in the preferred embodiment, first diameter D1 of first passage 17 is greater than either second diameter D2 or third diameter D3, of second passage 18 and third passage 20, respectively. It is important to note that the number of passages dedicated to measuring static pressure is determined by the number of plenums that probe 11 passes through. That is, if probe 11 passes through one plenum surrounding a combustor liner and is measuring the static pressure within a combustor liner, there will be two passages dedicated for measuring static pressure, as is disclosed in the preferred embodiment of probe 11 and shown in FIG. 4. Referring back to FIG. 3, along outer surface 15 of housing 12, is a second thermocouple 16 that extends to proximate second end 14. This second thermocouple can be added to probe 11 if it is desired to measure and record temperature of a fluid medium contained within a combustor chamber wall. Second thermocouple 16 may be fixed to outer surface 15 in a variety of configurations including radially outward of outer surface 15 or recessed within housing 12.

Probe 11, which is inserted into a combustion system, captures the fluid medium pressure and temperature, which is then transmitted, measured, and recorded by other components of the instrumentation assembly. Referring back to FIG. 1 and to FIG. 3, a first tubular conduit 23 is fixed to probe 11 at first end 13 such that it is in fluid communication with first passage 17. First tubular conduit 23 extends from probe 11, through an isolation valve, and to transducer mounting block 24, which contains a dynamic pressure transducer 25 for measuring the dynamic pressure of the fluid medium within first passage 17 and first tubular conduit 23. A first cable 26 is fixed to transducer mounting block 24 and extends from transducer mounting block 24 to a means for recording the dynamic pressure of the fluid medium within first conduit 23, typically an electronic monitoring system programmed to record data at predetermined intervals.

A second tubular conduit 27 is fixed to transducer mounting block 24 and extends to a means for measuring the internal static pressure 28 of the fluid medium contained within second tubular conduit 27, which was transmitted by first tubular conduit 23. The fluid medium within second tubular conduit 27, as with first tubular conduit 23, is captured by probe 11 from within a combustion chamber. Fixed to and extending from means for measuring internal static pressure 28 is a second cable 29 that extends to a means for recording the internal static pressure within second tubular conduit 27.

Referring now to FIGS. 1 and 4, a third tubular conduit 30 is fixed to probe 11 at first end 13 and is in fluid communication with third passage 20. Third tubular conduit 30 extends from probe 11 through a shutoff valve 31 to a means for measuring external static pressure 32 of the fluid medium contained within third tubular conduit 30. The fluid medium within third tubular conduit 30 is captured by the portion of probe 11 which is external to a combustion chamber wall, yet internal to a combustor casing wall, as shown in FIG. 4. Fixed to and extending from means for measuring external static pressure 31 is a third cable 33 that extends to a means for recording the external static pressure within third tubular conduit 30.

One skilled in the art will understand that the static pressure level measured at second opening 21 and third passage 20 can be obtained by alternate means. For example, static pressure levels at this location in the combustion system can be calculated from a total pressure reading if other factors such as mass flow and velocity of combustor gas flows are known. Total pressure can be determined using this same probe configuration if second opening 21 and third passage 20 are in line with the oncoming combustor gas flow.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. A removable probe for use in a gas turbine combustor, said probe capable of simultaneously measuring dynamic pressure, temperature and at least one static pressure within a combustor, said probe comprising:

- a housing having a first end, a second end, a centerline, and an outer surface;
- a first passage having a first diameter extending from said first end to said second end coaxial with said centerline;
- a second passage having a second diameter, said second passage extending from said first end to a first opening in said outer surface, said second passage radially outward from said first passage;
- a third passage having a third diameter, said third passage extending from said first end to a second opening in said outer surface, said third passage radially outward from said first passage and oriented such that said second opening is generally perpendicular to the flow of said combustion gases;
- wherein said first passage and said third passage are in communication with equipment to measure static pressure of a fluid medium contained within said first and third passages, such that said first passage captures internal static pressure of a combustion chamber and said third passage captures static pressure external of a combustion chamber;
- wherein said first passage is in communication with equipment to also measure dynamic pressure of a fluid medium contained within said first passage;
- wherein said second passage contains a first thermocouple extending into said first opening for measuring temperature of a fluid medium contained within said first opening.

2. The probe of claim 1 wherein said second end of said housing is positioned flush with a combustor chamber wall.

3. The probe of claim 1 wherein said housing is generally circular in cross section.

4. The probe of claim 1 wherein said first diameter is larger than both said second diameter and said third diameter.

5. The probe of claim 1 wherein said first opening in said outer surface is larger than said second opening in said outer surface.

6. The probe of claim 1 wherein said housing is at least partially manufactured from a high temperature alloy.

7. The probe of claim 1 wherein said probe further comprises a second thermocouple fixed to said outer surface and extending to proximate said second end for measuring temperature of a fluid medium proximate said second end.

8. A removable instrumentation assembly for use in a gas turbine combustor capable of simultaneously measuring dynamic pressure, temperature, and at least one static pressure within a combustor, said instrumentation assembly comprising:

- a probe comprising:
  - a housing having a first end, a second end, a centerline, and an outer surface;
  - a first passage having a first diameter extending from said first end to said second end coaxial with said centerline;

a second passage having a second diameter said second passage extending from said first end to a first opening in said outer surface, said second passage radially outward from said first passage;

a third passage having a third diameter, said third passage extending from said first end to a second opening in said outer surface, said third passage radially outward from said first passage and oriented such that said second opening is generally perpendicular to the flow of said combustion gases;

wherein said second passage contains a first thermocouple extending into said first opening for measuring temperature of a fluid medium contained within said first opening;

a first tubular conduit fixed to said probe and in fluid communication with said first passage, said first tubular conduit extending from said probe through an isolation valve to a transducer mounting block containing a dynamic pressure transducer;

a first cable fixed to and extending from said transducer mounting block, said first cable extending to a means for recording the dynamic pressure of a fluid medium within said first tubular conduit;

a second tubular conduit fixed to and extending from said transducer mounting block, said second tubular conduit extending to a means for measuring the internal static pressure of a fluid medium within said second conduit, said fluid medium captured internal to a combustion chamber;

a second cable fixed to said means for measuring the internal static pressure, said second cable extends to a means for recording the internal static pressure within second tubular conduit;

a third tubular conduit fixed to said probe and in fluid communication with said third passage, said third tubular conduit extending from said probe through a shutoff valve to a means for measuring the external static pressure of a fluid medium within said third conduit which is captured external to the combustion chamber;

a third cable fixed to said means for measuring the external static pressure said third cable extends to a means for recording the external static pressure within third tubular conduit.

9. The instrumentation assembly of claim 8 wherein said second end of said housing is, positioned flush with a combustor chamber wall.

10. The instrumentation assembly of claim 8 wherein said housing is generally circular in cross section.

11. The instrumentation assembly of claim 8 wherein said first diameter is larger than both said second diameter and said third diameter.

12. The instrumentation assembly of claim 8 wherein said first opening in said outer surface is larger than said second opening in said outer surface.

13. The instrumentation assembly of claim 8 wherein said housing is at least partially manufactured from a high temperature alloy.

14. The probe of claim 8 wherein said probe further comprises a second thermocouple fixed to said outer surface and extending to proximate said second end for measuring temperature of a fluid medium proximate said second end.

* * * * *